United States Patent
Craine

(10) Patent No.: US 8,957,635 B2
(45) Date of Patent: *Feb. 17, 2015

(54) EMERGENCY POWER GENERATING SOURCE FOR MOBILE DEVICES

(75) Inventor: Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 505 days.

This patent is subject to a terminal disclaimer.

(21) Appl. No.: 13/249,490

(22) Filed: Sep. 30, 2011

(65) Prior Publication Data

US 2012/0019199 A1   Jan. 26, 2012

Related U.S. Application Data

(63) Continuation of application No. 11/764,104, filed on Jun. 15, 2007, now Pat. No. 8,040,105.

(51) Int. Cl.
*H02J 7/00* (2006.01)
*H02J 7/14* (2006.01)
*H02K 7/18* (2006.01)

(52) U.S. Cl.
CPC ............. *H02J 7/1415* (2013.01); *H02J 7/1438* (2013.01); *H02K 7/1853* (2013.01)
USPC ............................ 320/114; 320/107; 320/123

(58) Field of Classification Search
USPC ........................................ 320/107, 114, 123
See application file for complete search history.

(56) References Cited

U.S. PATENT DOCUMENTS

| | | | |
|---|---|---|---|
| 6,236,214 B1 * | 5/2001 | Camp et al. | 324/427 |
| 6,405,062 B1 | 6/2002 | Izaki | |
| 2001/0017604 A1 | 8/2001 | Jacobsen et al. | |
| 2007/0102928 A1 * | 5/2007 | Yang | 290/1 C |

OTHER PUBLICATIONS

U.S. Office Action dated Oct. 1, 2009 in U.S. Appl. No. 11/764,104.
U.S. Office Action dated Apr. 13, 2010 in U.S. Appl. No. 11/764,104.
U.S. Office Action dated Aug. 19, 2010 in U.S. Appl. No. 11/764,104.
U.S. Office Action dated Feb. 15, 2011 in U.S. Appl. No. 11/764,104.
U.S. Notice of Allowance dated Jun. 23, 2011 in U.S. Appl. No. 11/764,104.

\* cited by examiner

*Primary Examiner* — Edward Tso
*Assistant Examiner* — Aaron Piggush
(74) *Attorney, Agent, or Firm* — Hartman & Citrin LLC

(57) ABSTRACT

Various portable electronic devices are respectively equipped so that manually provided mechanical energy is converted into electrical energy and stored therein. The stored electrical energy can be used to power the respective portable electronic device for at least a brief period. Suitably equipped portable electronic devices can thus be operated in emergency situations without external sources of electrical power, replacement batteries, or the like.

15 Claims, 3 Drawing Sheets

EMERGENCY POWER GENERATING SOURCE FOR MOBILE DEVICES

This application is a continuation of U.S. patent application Ser. No. 11/764,104, filed Jun. 15, 2007, now U.S. Pat. No. 8,040,105, the content of which is hereby incorporated by reference herein in its entirety.

BACKGROUND

Millions of portable electronic devices are in everyday use in the United States alone. Globally, the number is even greater. Examples of such devices include personal digital assistants (PDAs), laptop computers, cellular phones, two-way radios, global positioning system (GPS) receivers, wireless modems, etc. The foregoing are just a few of the numerous types of portable electronic devices that many people depend on for business, industry, and management of personal and family matters. Unfortunately, many users are disappointed with the relatively short operating time provided by limited battery capacity. Furthermore, circumstances often prevent recharging a portable device with sufficient regularity to avoid "dead battery" situations altogether.

Sometimes, a lack of battery capacity is a mere inconvenience to the user. However, emergencies do arise in which a portable electronic device—say, related to GPS locating and/or two-way communication—can mitigate critical circumstances. What's more, just a brief period of operation can make all the difference. For example, 40 seconds of available power so as to place an emergency cellular phone call can favorably alter the outcome of a life-or-death situation. Therefore, means and methods for providing useful operating energy to portable electronic devices would have appreciable utility.

SUMMARY

This summary is provided to introduce general concepts of emergency power generating sources for portable electronic devices, which are further described below in the Detailed Description. This summary is not intended to identify essential features of the claimed subject matter, nor is it intended to limit the scope of the claimed subject matter.

In one aspect, a portable apparatus comprises a housing, and electronic circuitry supported by the housing. The apparatus also includes a mechanical assembly supported by the housing. The mechanical assembly is configured to receive mechanical energy manually input by a user. The portable apparatus also includes a generator supported by the housing and coupled to the mechanical assembly. The generator is configured to convert the mechanical energy into electrical energy. The portable apparatus further includes one or more storage devices configured to store the electrical energy from the generator. The electronic circuitry is configured to access the electrical energy stored by the one or more storage devices.

In another aspect, a portable electronic device includes a housing, and electronic circuitry supported by the housing, the electronic circuitry configured to perform at least one cellular communications function. The device also includes a mechanical assembly supported by the housing. The mechanical assembly is configured to derive mechanical energy from direct user manipulations of the mechanical assembly itself. The portable electronic device further includes a generator supported by the housing, and configured to convert the mechanical energy into electrical energy. Also included is power conditioning circuitry that is supported by the housing. The power conditioning circuitry is configured to condition one or more aspects of the electrical energy from the generator. The portable electronic device also includes one or more storage devices supported by the housing and configured to store the electrical energy from the power conditioning circuitry. Furthermore, the electronic circuitry is also configured to access the electrical energy stored by the one or more storage devices.

In yet another aspect, a method is provided that includes receiving mechanical energy manually input to a portable electronic device. The method also includes converting the mechanical energy into electrical energy. Furthermore, the method includes storing the electrical energy on board the portable electronic device.

BRIEF DESCRIPTION OF THE DRAWINGS

The detailed description is set forth with reference to the accompanying figures. The use of the same reference numbers in different figures indicates similar or identical items.

DETAILED DESCRIPTION

Overview

This disclosure is directed to emergency power generating sources and supporting elements for inclusion within various forms of portable electronic devices. Providing an onboard system for generating and storing electrical power makes possible usage of the portable device's various functions in emergencies and other brief-need scenarios. Generally, a user of the device is the original source of mechanical energy that is converted to electrical energy, conditioned (if necessary), and stored. Various means for inputting a user's manual energies are envisioned, including the use of a scroll wheel, a trackball, a crank handle, the sliding case of the portable electronic device itself, etc. The foregoing examples represent just a few of many different energy generation mechanisms that may be used to generate power for a portable device. Thus, versatility in the design of such portable electronic devices is contemplated.

Illustrative Portable Electronic Devices

Figure 1:
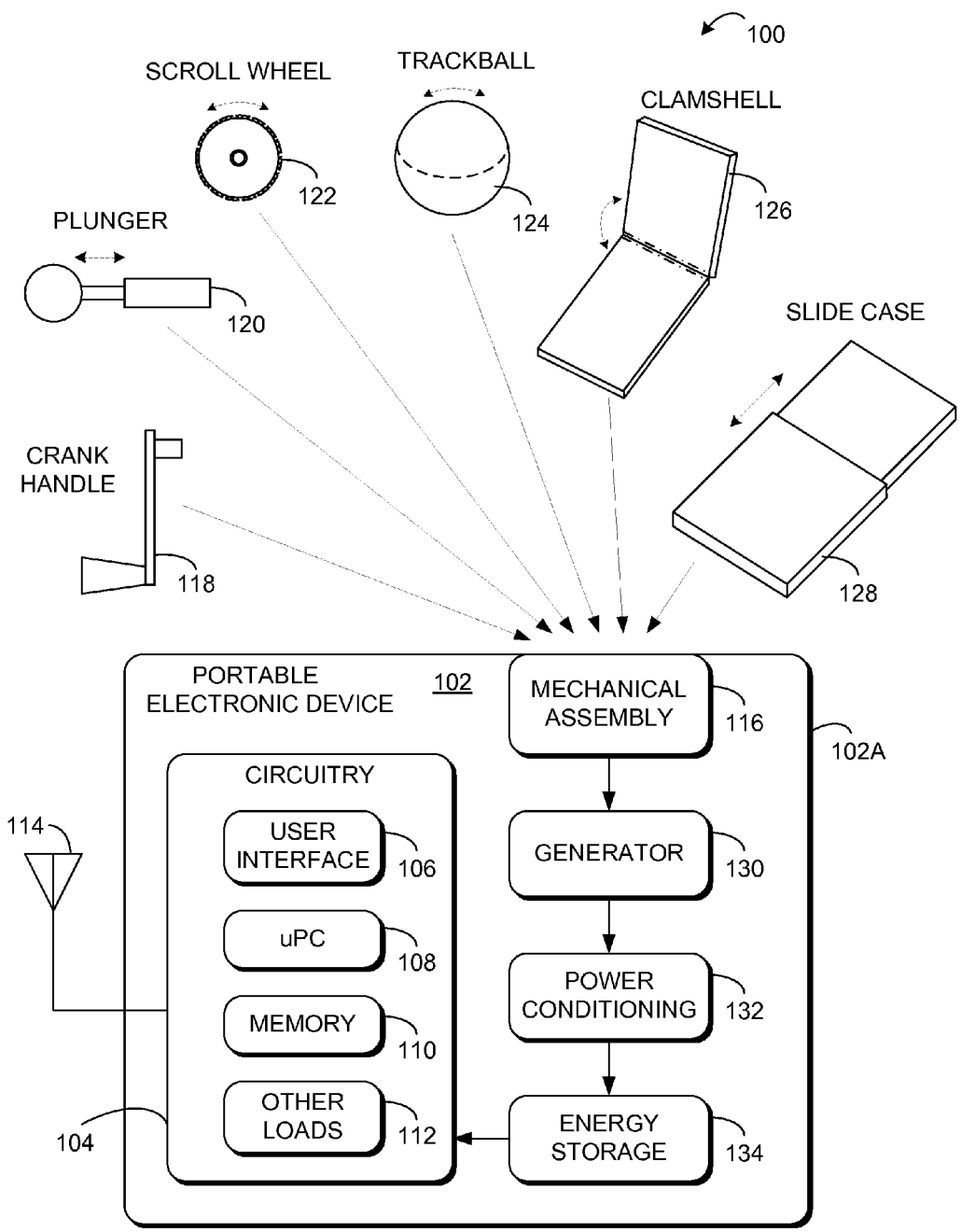
FIG. 1 is a schematic view showing an illustrative portable electronic device with built-in electrical generating functionality.

FIG. 1 illustrates an illustrative portable electronic device system 100. The system 100 includes a portable electronic device (PED) 102. The PED 102 includes a suitable housing 102A configured to support components of the PED 102. The PED 102 includes electronic circuitry 104. As shown, the electronic circuitry 104 includes a user interface 106, a processor 108, memory 110, other electrical and/or electronic loads 112, and an antenna 114. In one example, the electronic circuitry 104 is configured to function as a cellular telephone. In another example, the electronic circuitry 104 is configured to function as a personal digital assistant (PDA). Other embodiments of the electronic circuitry 104 can be defined and used so as to function as, for example, one or more of a wireless (i.e., cordless or portable) phone, a wireless modem, a two-way radio (i.e., "walkie-talkie"), a portable (i.e., laptop or palmtop) computer, a global positioning system (GPS) receiver, or a wireless digital communications device. The electronic circuitry 104 is exemplary in nature and is not intended to limit the scope of the present teachings. In any case, the electronic circuitry 104 is configured to perform one or more predetermined functions, thus giving the PED 102 its principle identity or functionality (e.g., cell phone, PDA, etc.).

The PED 102 of FIG. 1 also includes a mechanical assembly 116. The mechanical assembly includes, and is configured to receive manually input mechanical energy from one or more input devices. Non-limiting examples of such input devices include a crank handle 118, a linear-motion plunger 120, a rotatable scroll wheel 122, a trackball 124, an openable and closeable (i.e., folding) clamshell arrangement or housing 126, and an openable and closeable sliding case arrangement or housing 128. In one example, the mechanical assembly 116 is configured to convert cyclic linear motion from the plunger 120 (or the sliding case arrangement 128, etc.) into rotating mechanical energy. In another example, the mechanical assembly 116 is configured to convert rotating motion from the scroll wheel 122 from a first angular velocity (i.e., RPM) to a second angular velocity. In yet another example, the mechanical assembly 116 is configured to convert repeated opening and closing manipulations of the clamshell arrangement 126 into rotating or linear mechanical energy.

In the illustrated embodiment, the mechanical assembly 116 is configured to convert one form of mechanical energy input, as provided directly by user manipulations, into another suitable form of mechanical energy (or motion). Thus, the mechanical assembly 116 can include a gear train, linkages, reciprocating and/or rotating parts, etc., as needed in accordance with a particular PED 102. The mechanical assembly 116 can be relatively simple or complex, as needed, to suit the particular PED 102. The majority, if not all, of the mechanical assembly 116 is configured to be supported within the housing 102A of the PED 102. However, in other embodiments, the mechanical assembly 116 may be omitted, combined with another element (e.g., the generator), or otherwise modified as necessary or desired for a given application.

The PED 102 of the system 100 can be configured to include one or more of the input devices 118-128, as suitably coupled to a corresponding embodiment of the mechanical assembly 116. For example, a PED 102, whose principle function is that of a cellular phone, can be provided and supported within a clamshell housing arrangement 126. The exemplary PED 102 can also include a scroll wheel 122 that is supported by the clamshell housing 126. In this example, the scroll wheel 122 is used primarily to scroll through and/or select from menu items presented to a user by way of the user interface 106. However, either or both of the scroll wheel 122 and the clamshell housing 126 can be coupled to a mechanical assembly 116 that is configured to convert user manipulations of the scroll wheel 122 and/or clamshell housing 126 into a suitable form of mechanical energy (e.g., a rotating shaft, etc.).

The PED 102 of FIG. 1 also includes a generator 130. The generator 130 is coupled to receive mechanical energy from the mechanical assembly 116 (or in other examples directly from the scroll wheel, clamshell housing, or other source of manual energy input). The generator 130 is configured to convert mechanical energy into electrical energy. The generator 130 can include, for example, one or permanent magnets, one or more coil assemblies cooperative with the permanent magnet(s), an electrically energized excitation coil, etc. The generator 130 can comprise a direct current (D.C.) generator, an alternating current (A.C.) generator, a generator that produces cyclic and/or non-cyclic pulses of electrical energy, etc. The precise embodiment of the generator 130 can be suitably selected in accordance with other factors of a particular PED 102.

The PED 102 may also include power conditioning circuitry (PCC) 132. The PCC 132 is coupled to and receives electrical energy from the generator 130. The power conditioning circuitry 132 is configured to condition one or more aspects (characteristics) of the electrical energy received from the generator 130. Such conditioning performed by the PCC 132 can include, as non-limiting examples, rectification of A.C. electrical energy, voltage regulation, current regulation, and voltage and/or current limiting. The PCC 132 can be further configured to protect against overcharging one or more energy storage devices (described below). The PCC 132 can be suitably defined and provided in accordance with the particular needs of the PED 102 being served.

The PED 102 of FIG. 1 also includes one or more energy storage devices 134. The energy storage device(s) 134 is/are configured to receive and store conditioned electrical power from the PCC 132. In one example, the energy storage device(s) 134 is/are defined by one or more rechargeable batteries. In another example, the energy storage device(s) 134 is/are defined by one or more capacitors or super-capacitors. Other forms of energy storage 134 can also be used. The electronic circuitry 104 of the PED 102 is coupled to and can access, monitor, and/or utilize the electrical energy stored by the energy storage device(s) 134. In this way, the PED 102 is equipped to generate, condition, and store electrical energy directly from a user's manual input. Such stored electrical energy can then be accessed (used) in order to power, for at least a short time, one or more principle functions of the portable electronic device.

Illustrative Operations

Figure 2:
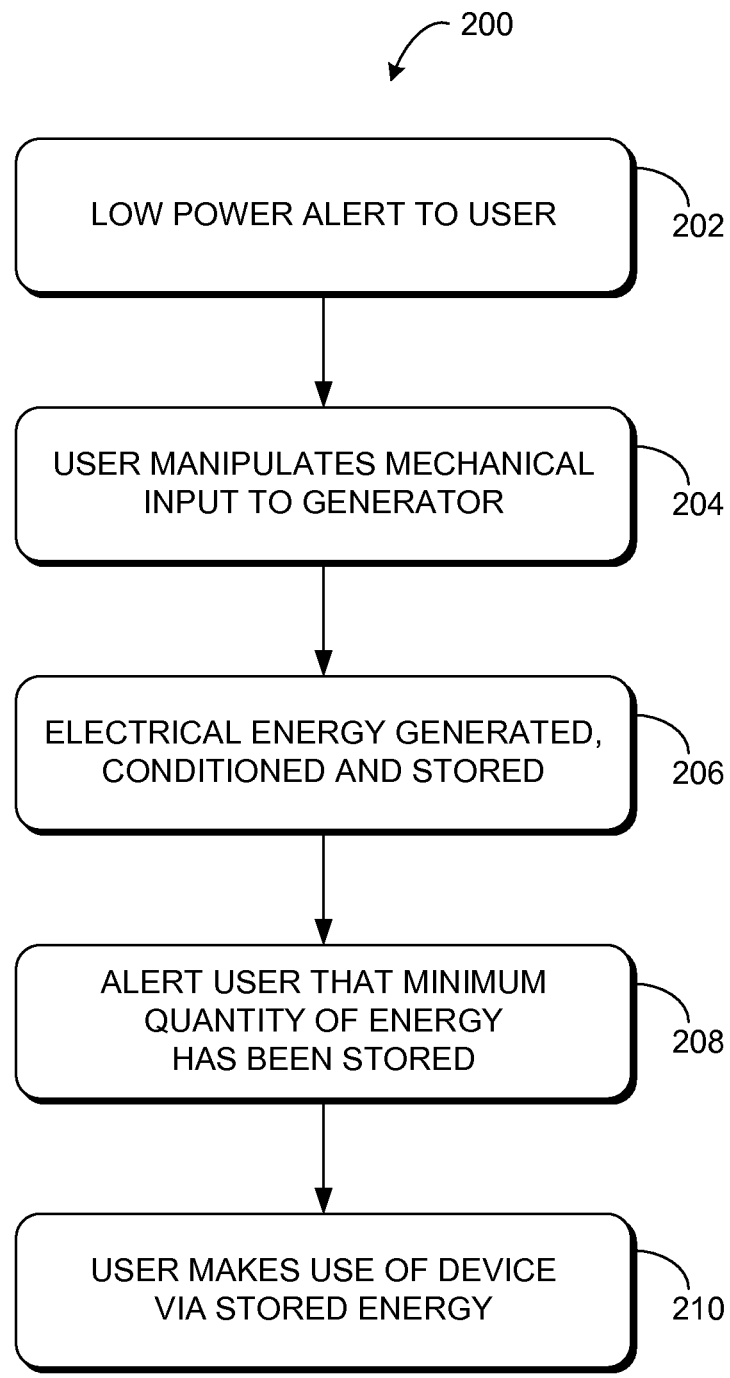
FIG. 2 is a flowchart depicting one illustrative method of use of a portable electronic device.

FIG. 2 is a flowchart depicting a method 200 performed by a portable electronic device equipped in accordance with the present teachings. The method 200 of FIG. 2 depicts specific methodical acts and order of execution. However, other methods including at least some of these and/or other acts or steps, and/or other orders of execution, can be used in accordance with the present teachings. For purpose of understanding, the method 200 is described with exemplary reference to the PED 102 of FIG. 1. However, the method 200 may be performed using other types of electronic devices.

At 202 (FIG. 2), a low energy (i.e., "low battery") alert is issued to a user of the PED 102 (FIG. 1). This alert can be audible and/or visual, vibratory, etc., in accordance with the capabilities and configuration of the electronic circuitry 104 of electronic device 102. Such an alert can include, for example, visual instructions to a user as to how to manipulate the PED 102 in order to manually generate a store of electrical energy.

At 204 (FIG. 2), the PED 102 receives mechanical energy input by a user manipulating one or more input devices of the mechanical assembly 116 (FIG. 1). For example, a user may input mechanical energy by rolling a trackball 124 of the PED 102 for some period of time (e.g., two minutes). Manual rolling of the trackball 124 provides mechanical input energy that is coupled to the generator 130 by way of the mechanical assembly 116.

At 206 (FIG. 2), the generator 130 (FIG. 1) converts the mechanical energy provided by way of the trackball 124 into electrical energy. The electrical energy may then be suitably conditioned by PCC 132. In the present example, the PCC 132 outputs a regulated current of predetermined polarity. Furthermore, the conditioned electrical power is stored in one or more storage devices (e.g., batteries) 134.

At 208 (FIG. 2), the PED 102 (FIG. 1) provides an alert or other indication to the user that a minimum quantity of energy has been generated, conditioned and/or stored by the one or more energy storage devices 134. Such an indication, which can be audible, visual, etc., can be provided by way of the user interface 106 of the circuitry 104. This minimum quantity of stored energy might correspond to, for example, one minute of on-the-air time for a cellular phone. Other indications corresponding to other minimum usage periods can also be used. The user now has a good degree of assurance that some predetermined amount of operation of the PED 102 is now possible. Such a usage period is typically—but not necessarily—brief in nature.

At 210 (FIG. 2), the user may cease to manipulate (operate) the mechanical input, and may activate one or more functions of the PED 102 (FIG. 1). The PED 102 operates by way of the electrical energy generated, conditioned and stored in steps 204-206 above. Such operations may continue until another low energy alert is given, the user finishes the present usage, etc. Steps 202-210 can be repeated as needed to perform one or more usages of the PED 102.

In another method, one or more alerts can be provided to the user as discrete, predetermined quantities of electrical energy are stored by the energy storage device(s) 134. For example, a bar-graph can be displayed by way of the user interface 106, wherein tick marks corresponding to each half-minute of device operation are provided. Such a method serves to avoid user frustration by assuring some minimum usage time of the PED 102. In this way, for example, a user knows when sufficient electrical energy has been generated, conditioned and stored so as to place a short (e.g., two-minute) cellular phone call, dispatch a short text message from a wireless communications device, acquire a reliable location fix by way of GPS positioning, etc.

Illustrative Generating Means

Figure 3:
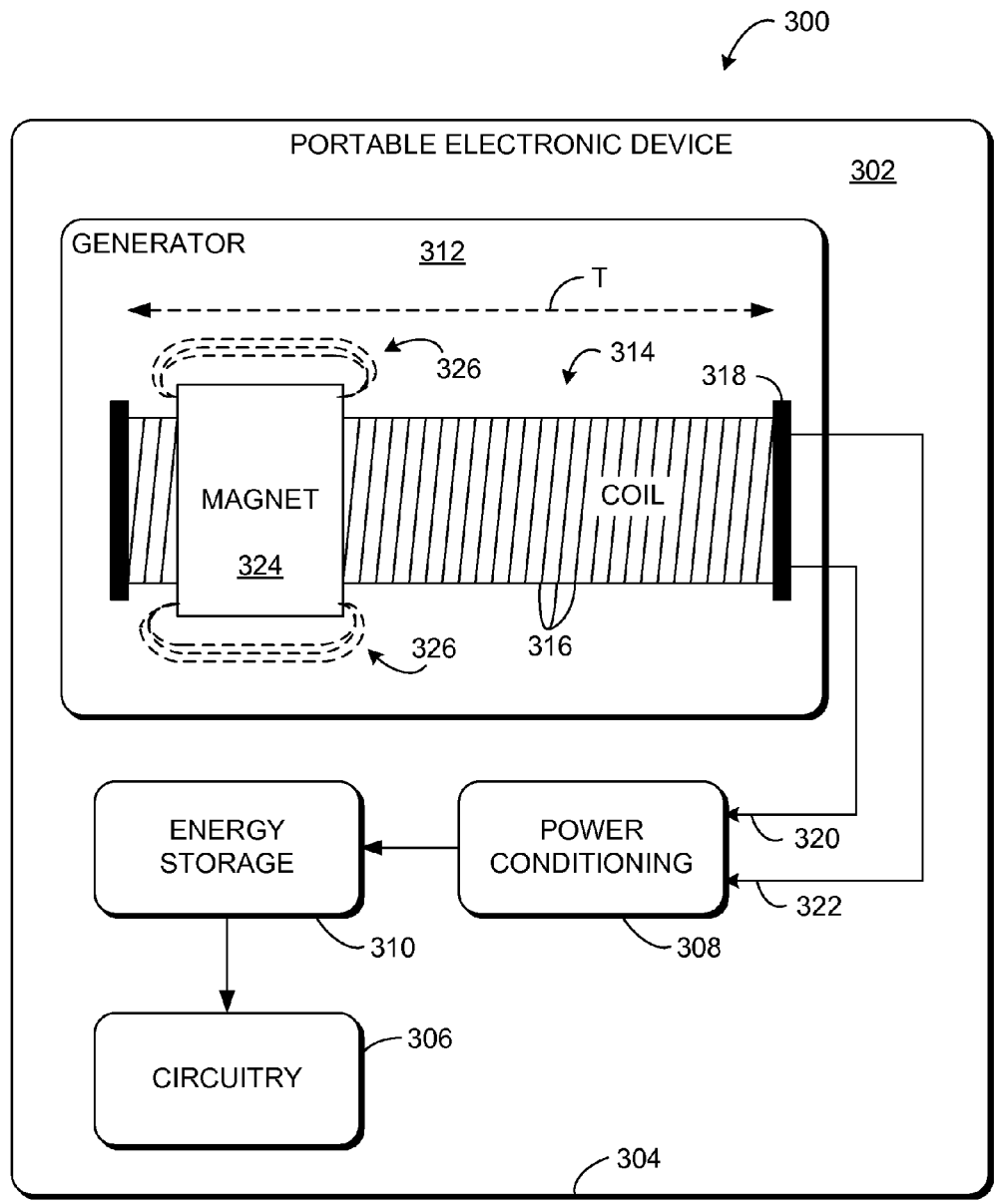
FIG. 3 is a schematic view showing an illustrative portable electronic device with other built-in electrical generating functionality.

FIG. 3 shows a system 300 in accordance with one illustrative electrical energy generation means, in the form of a linear generator. The system 300 includes a portable electronic device (PED) 302. The PED 302 includes a housing 304 configured to support the components of the PED 302. The PED 302 includes circuitry 306 such that the PED 302 defines at least one of a cellular phone, a PDA, a laptop or palmtop computer, etc. Other PEDs 302 can also be defined. In short, the PED 302 includes one or more predetermined functions (identities). The PED 302 also includes and houses power conditioning circuitry (PCC) 308 and one or more energy storage devices 310 that may be defined and configured substantially as described above in regard to elements 132 and 134, respectively, of FIG. 1.

The PED 302 also includes a generator 312. In one example, the generator 312 includes a coil 314. The coil 314 includes several turns of fine wire 316 helically wound about a support tube 318. In one embodiment, the coil 314 includes in excess of one thousand turns of wire 316. In any case, the two respective ends 320 and 322 of the wire 316 are electrically coupled to the PCC 308. However, in other embodiments, the generator 312 may include any other known type generator capable of converting mechanical energy into electrical energy.

The generator 312 of FIG. 3 also includes a magnet 324. The magnet 324 provides a magnetic field 326. As illustrated, the magnet 324 is general toroidal in form and is supported about the coil 314. Other embodiments of magnet 324 having other geometric forms can also be used. The coil 314 is supportably fixed to the housing 304 of the PED 302. In turn, the magnet 324 is capable of sliding back and forth along the outside of the coil 314 as indicated by the travel arrow "T".

During normal operation of the PED 302 of FIG. 3, circuitry 306 draws power from the one or more energy storage devices 310. Upon detection of a low stored energy (i.e., "low battery") condition, the PED 302 provides an alert to a user. The user then shakes or rocks the PED 302 so as to cause the magnet 324 to slide back and forth along the coil 314 as shown by arrow "T". Engraved markings on the housing 304, electronically provided instructions, or any other suitable instructions can show the user the axis along which to shake the PED 302. In so doing, the magnetic field 326 induces an electrical current in the wire 316 of the coil 314. This induced electrical energy is coupled to the PCC 308, which conditions the electrical energy and provides it to the energy storage device(s) 310. Suitable alerts can inform a user when sufficient generated power has been stored to permit a predetermined period (e.g., thirty seconds, one minute, two minutes, etc.) of typical use of the PED 302. In another embodiment, normal use and/or transportation of the PED 302 provides sufficient motion to generate at least some electrical power by way of the generator 312.

The PED 302 of FIG. 3 may be such that essentially all of the elements 306, 308, 310 and 312 can be completely enclosed within the housing 304. The PED 302—be it principally a PDA, GPS receiver, etc.—can be hermetically sealed and permit emergency user-powered operations, for example, under water, in high-dust or sandstorm conditions, etc. Alternatively, in other implementations, some of the components may be located outside the housing.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A portable apparatus comprising:
   a mechanical assembly configured to receive mechanical energy manually input by a user;
   a generator coupled to the mechanical assembly and configured to convert the mechanical energy into electrical energy;
   an energy storage configured to store the electrical energy from the generator; and
   an electronic circuitry configured to dispatch a text message and acquire a global positioning system location fix, wherein the electronic circuitry is further configured to access the electrical energy stored by the energy storage;
   wherein one or more alerts are provided to the user, each alert indicating to the user that sufficient electrical energy has been generated, conditioned, and stored for dispatching a text message and acquiring a global positioning system location fix.

2. The portable apparatus of claim 1, wherein the mechanical assembly includes at least one of a scroll wheel, a crank handle, a plunger device, or a trackball respectively configured to be directly manipulated by the user.

3. The portable apparatus of claim 1, wherein the mechanical assembly includes a hinged clamshell housing so as to receive the mechanical energy by way of user manipulations of the hinged clamshell housing.

4. The portable apparatus of claim 1, wherein the mechanical assembly includes a sliding case housing so as to receive the mechanical energy by way of user manipulations of the sliding case housing.

5. The portable apparatus of claim 1, wherein the electronic circuitry is further configured to function as at least one of a portable digital assistant, a wireless phone, a cellular phone, a wireless modem, a two-way radio, a portable computer, a global positioning system receiver, or a wireless digital communications device.

6. The portable apparatus of claim 1, further comprising power conditioning circuitry configured to receive the electrical energy from the generator and provide conditioned electrical energy to the energy storage.

7. The portable apparatus of claim 6, wherein the power conditioning circuitry is configured to perform at least one of rectification, voltage regulation, current regulation, voltage limiting, current limiting, or protection against overcharging the energy storage.

8. A portable electronic device comprising:
a mechanical assembly configured to derive mechanical energy from direct user manipulation of the mechanical assembly;
a generator configured to convert the mechanical energy from the mechanical assembly into electrical energy;
a power conditioning circuitry configured to condition one or more aspects of the electrical energy from the generator;
an energy storage device configured to store the electrical energy from the power conditioning circuitry; and
an electronic circuitry configured to dispatch a text message and acquire a global positioning system location fix, wherein the electronic circuitry is further configured to access the electrical energy stored by the energy storage device;
wherein one or more alerts are provided to a user, each alert indicating to the user that sufficient electrical energy has been generated, conditioned, and stored for dispatching a text message and acquiring a global positioning system location fix.

9. The portable electronic device of claim 8, wherein the direct user manipulation includes cyclic linear motion and rotating motion.

10. The portable electronic device of claim 8, wherein the mechanical assembly includes a hinged clamshell housing and wherein the mechanical assembly is coupled to the hinged clamshell housing so as to derive the mechanical energy by way of direct user manipulations of the hinged clamshell housing.

11. The portable electronic device of claim 8, wherein the mechanical assembly includes a sliding case housing so as to receive the mechanical energy by way of direct user manipulations of the sliding case housing.

12. The portable electronic device of claim 8, wherein the power conditioning circuitry is configured to perform one or more of rectification, voltage regulation, current regulation, voltage limiting, current limiting, or protection against overcharging the energy storage device.

13. The portable electronic device of claim 8, wherein the electronic circuitry is further configured to function as at least one of a portable digital assistant, a wireless phone, a cellular phone, a wireless modem, a two-way radio, a portable computer, a global positioning system receiver, or a wireless digital communications device.

14. The portable electronic device of claim 8, wherein the electronic circuitry is further configured to provide an alert to the user in response to a low stored energy condition of the energy storage device.

15. The portable electronic device of claim 8, wherein the mechanical assembly is further configured to derive mechanical energy from two or more different modes of direct user manipulation of the mechanical assembly.

* * * * *